United States Patent [19]

Kato et al.

[11] 4,216,595

[45] Aug. 12, 1980

[54] METHOD OF COLLECTING SHELLFISH

[76] Inventors: Hisao Kato, No. 37, 2-chome, Showa-machi, Nemuro City, Hokkaido; Yohei Sakamoto, No. 1, 1-chome, Hon-cho, Nemuro City, Hokkaido, both of Japan

[21] Appl. No.: 916,060

[22] Filed: Jun. 16, 1978

Related U.S. Application Data

[60] Continuation-in-part of Ser. No. 901,693, May 1, 1978, abandoned, which is a division of Ser. No. 723,470, Sep. 15, 1976, Pat. No. 4,112,602.

[51] Int. Cl.$^2$ ............................ A01K 75/00; E02F 5/00
[52] U.S. Cl. ............................................. 37/195; 37/55
[58] Field of Search ...................... 37/55, 119, 71, 195

[56] References Cited

U.S. PATENT DOCUMENTS

| | | | |
|---|---|---|---|
| 27,213 | 2/1860 | Force | 37/119 |
| 2,002,599 | 5/1935 | Bennett | 37/55 |
| 2,648,918 | 8/1953 | Mazzella | 37/55 |
| 2,672,700 | 3/1954 | Hanks, Jr. | 37/55 |
| 3,113,389 | 12/1963 | Vuskovich | 37/119 |
| 3,367,048 | 2/1968 | Doughty | 37/55 |
| 3,608,217 | 9/1971 | Voisin, Sr. | 37/55 |
| 3,777,377 | 12/1973 | Toritani | 37/71 X |

*Primary Examiner*—Clifford D. Crowder

[57] ABSTRACT

A method of collecting shellfish using a device riding on the bottom of the water and towed by a boat. The device has a number of obliquely extending tines and a net bag at the back of the tines for collecting shellfish which ride up onto the tines. The device is held by a rope without powered movement of the boat itself and moved selectively with respect to the boat by pulling on the rope through a winch, thereby moving the apparatus on the water bed to collect the shellfish.

8 Claims, 16 Drawing Figures

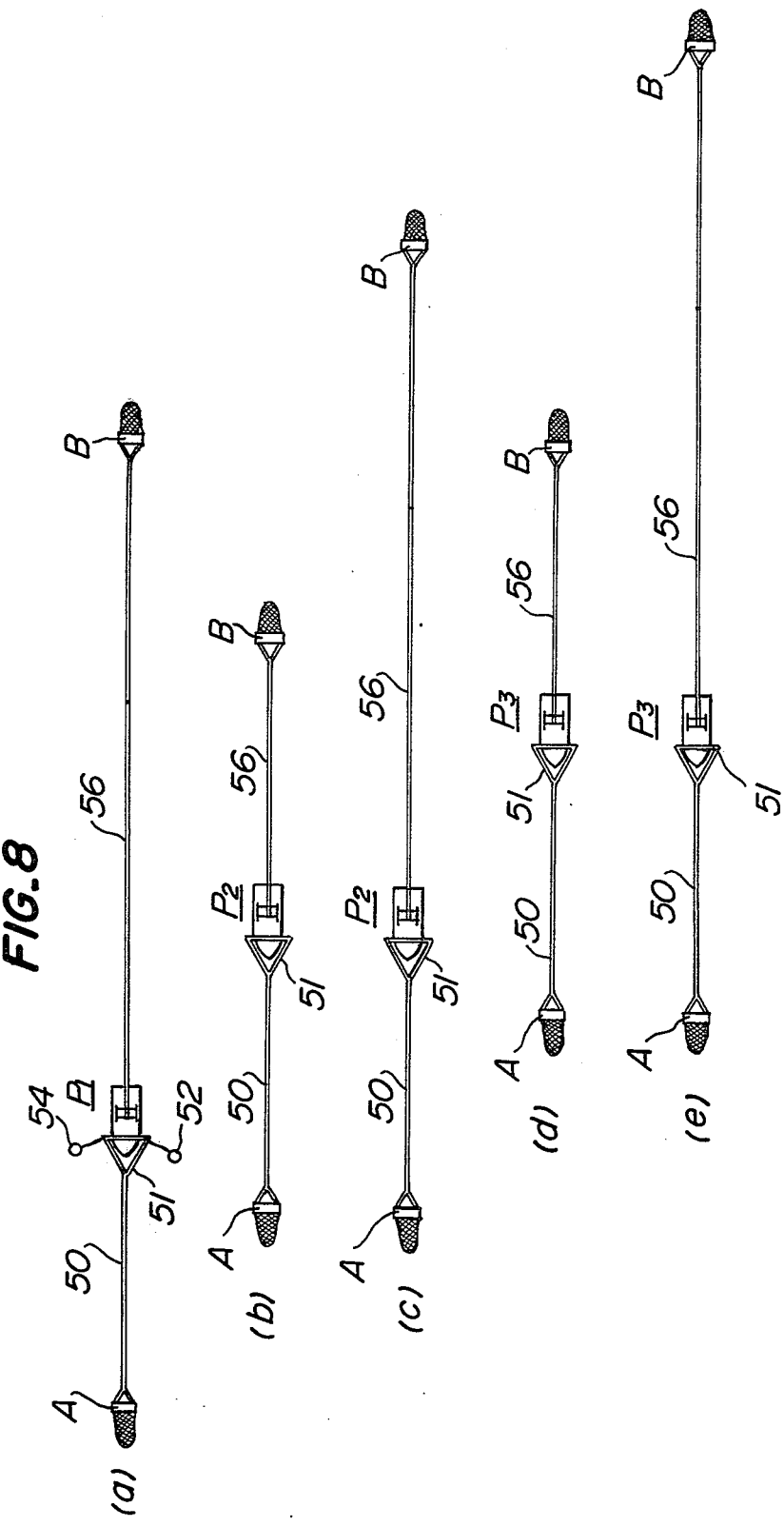

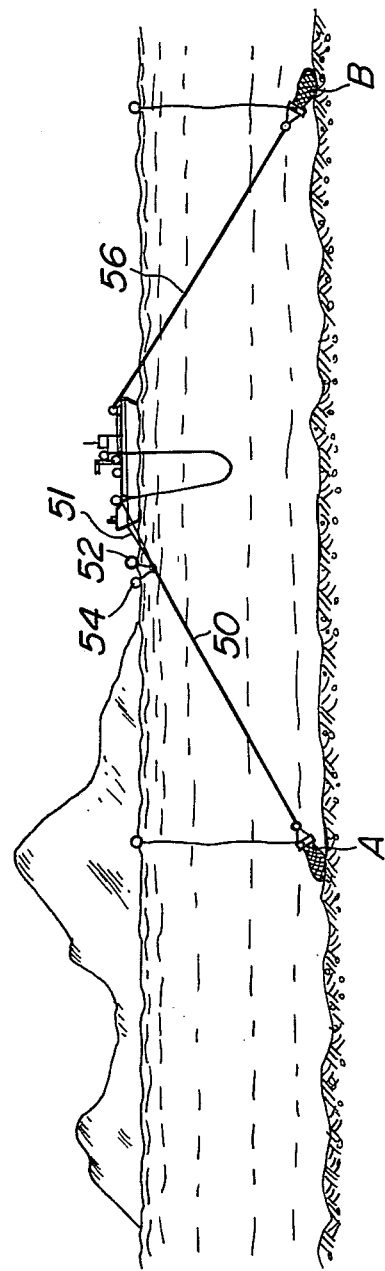

4,216,595

METHOD OF COLLECTING SHELLFISH

RELATED APPLICATIONS

The present application is a continuation-in-part of Ser. No. 901,693 filed May 1, 1978, now abandoned which in turn is a divisional application of copending Ser. No. 723,470 filed Sept. 15, 1976 now U.S. Pat. No. 4,112,602 issued Sept. 12, 1978.

BACKGROUND OF THE INVENTION

1. Field of the Invention

This invention relates to an apparatus and a method for collecting shellfish such as scallops and hen clams and more extensively mollusca crustaceans that move very slowly at the bottom of a body of water, and more particularly to an apparatus and a method for efficiently collecting shellfish without catching infant shellfish in a manner so as to preserve the resources in the sea.

2. Description of the Prior Art

Heretofore, to collect shellfish in sea, sand at the bottom of the sea is dredged by floating cranes, bucket dredgers and similar bulky apparatus, and the dredged shellfish are separated from considerable quantities of the dredged material. Such a method requires bulky equipment and consumes great amounts of energy. It is very difficult and troublesome to move from one position where a floating crane or dredger is anchored to a new position for additional collection of shellfish. As the zones in the sea to be dredged by the floating crane or bucket dredger are limited to relatively shallow bottoms, it is impossible to collect shellfish at the bed of a deep sea. Moreover, the dredging operation by these mechanical apparatuses deeply penetrates the bottom of the sea and devastates it to an impermissible extent. All shellfish in the dredged material are caught including infant shellfish which must be left behind to insure sufficient shellfish for future catches. The hitherto used method therefore, gives rise to problems in respect to a preservation of resources.

In another conventional method of collecting shellfish, divers don diver's outfits and collect shellfish at the bottom of the sea into bags which are then pulled up to the deck of a ship when the bags become filled. Such a method, however, is inefficient and requires high personal expenses.

SUMMARY OF THE INVENTION

It has also been suggested that apparatus for collecting shellfish be settled at the bottom of the sea and dragged by the boat while being driven by its screw. This method consumes the power of engine and the ship fuel thus increasing the cost of operation. When this method is used for investigating the sea's resources, its low efficiency is not permissible, and from a practical standpoint impossible.

It is an object of the invention to provide a method of collecting shellfish and the like, which minimizes the time for moving a boat and the use of the power of the boat's engine or its fuel and is advantageous for the purpose of investigation of resources at the bottom of a body of water.

In the aforementioned U.S. Pat. No. 4,112,602 there is disclosed a device for collecting shellfish comprising rake means having a number of inclined spaced tines capable of scraping the water bed to cause the shellfish to ride thereon as said apparatus moves, sliding box means or runners for holding the tines of said rake means at a substantially constant angle relative to said water bed, and a bag net at the rear of said rake means for collecting the shellfish which ride up onto said rake means as said apparatus moves.

The method according to the invention comprises moving the aforesaid device or similar devices along the bed of the body of water by pulling thereon by a winch and without movement of the boat's screw, so as to cause the shellfish to ride thereon and further moving the device in the same direction to collect said shellfish into a bag net at the rear of the rake.

It is an object of the invention to provide a method for collecting shellfish and the like which is simple in construction and has a high mobility for catching shellfish and the like over wide areas of a body of water.

It is another object of the invention to provide a method for collecting shellfish and the like which is capable of collecting the shellfish in a relatively deep sea, without devastating the bottom of the sea, and without collecting infant shellfish, with a resultant preservation of resources at the bottom of the sea.

The invention will be more fully understood by referring to the following detailed specification and claims taken in connection with the appended drawings.

BRIEF DESCRIPTION OF THE DRAWINGS

FIGS. 8(a)–(e) are schematic representations showing the preferred methods of collecting shellfish according to the present invention; and FIG. 9 is a side view of a boat, in the water illustrating the method shown in FIG. 8.

DETAILED DESCRIPTION OF THE PREFERRED EMBODIMENTS

Figure 1:
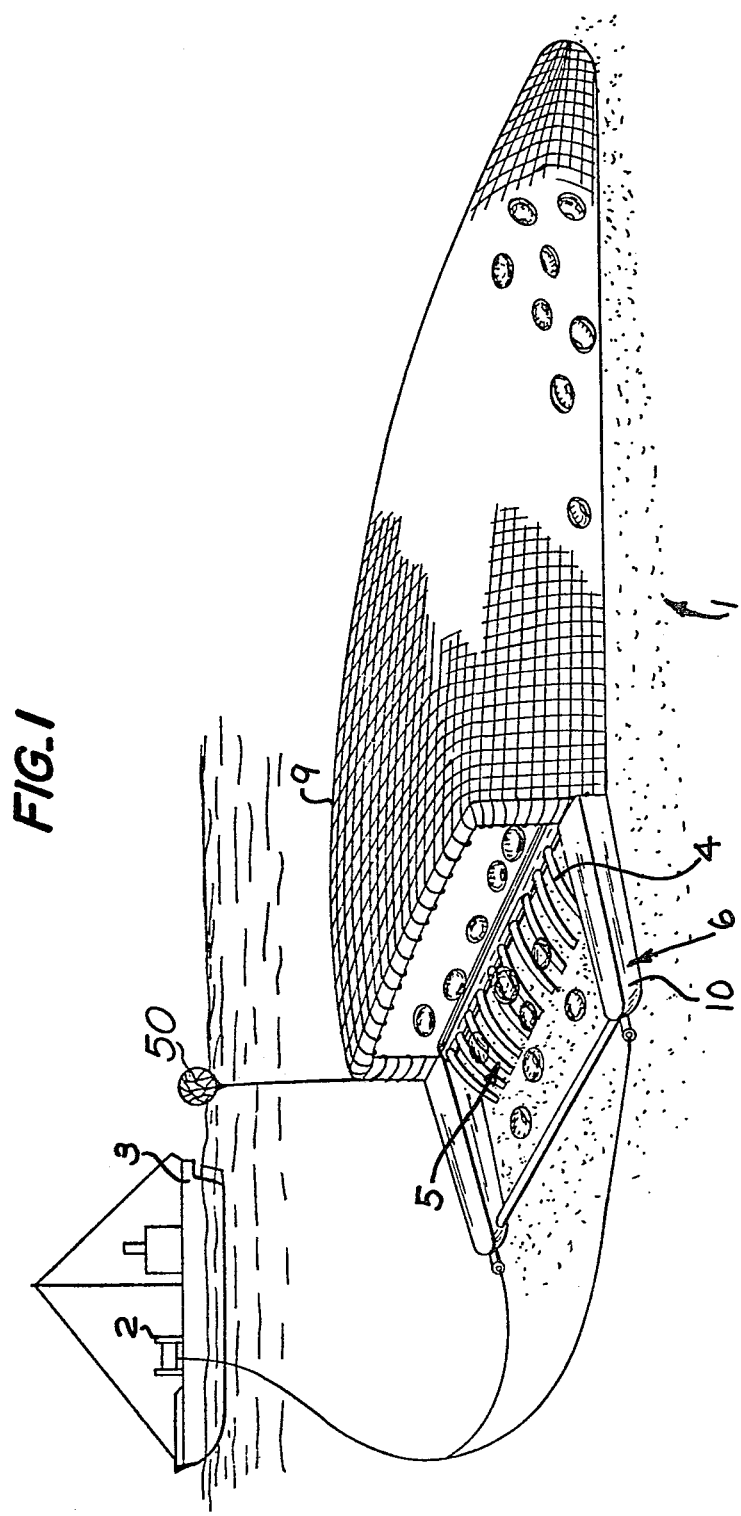
FIG. 1 is a perspective view of a preferred embodiment of the apparatus according to the invention which is being towed or dragged by a boat for collecting shellfish at the bottom of the sea.

Referring first to FIG. 1, there is shown a perspective view of the apparatus employable in the present invention which is being towed by a winch 2 on a boat or trawler 3 for collecting shellfish on or in sands at the bottom or bed of the sea. The apparatus may be towed or dragged by a tugboat or by a warp or rope to be wound by the winch on a boat.

Figure 2:
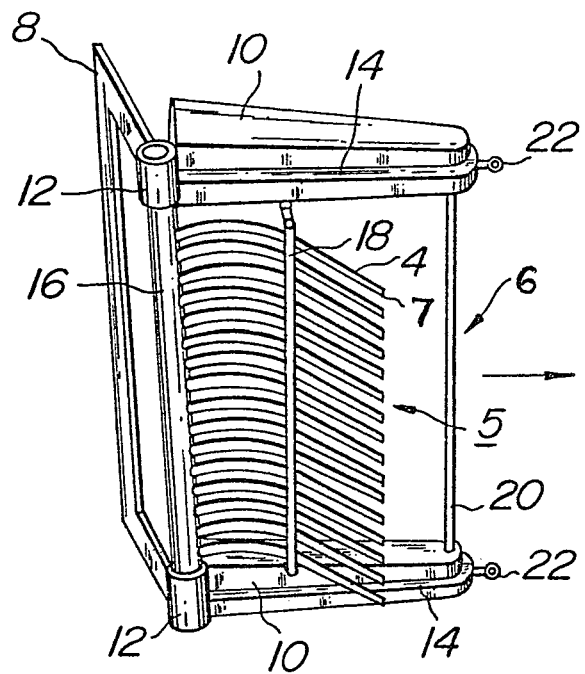
FIG. 2 is a perspective view of one embodiment of the apparatus according to the invention as viewed from below, the rake being contacted with the bottom of the sea.

FIG. 2 is a perspective view of a main body or frame 6 of the apparatus as viewed from below adapted to be brought into contact with the bottom of the sea in order to clarify the construction of the apparatus. The main body or frame 6 of the apparatus is to be dragged in a direction shown by the arrow in FIG. 2. When the apparatus is dragged in the direction of the arrow, the forward ends 7 of a number of tines or teeth 4 of a rake 5 enter the sand and dip up shellfish and the like which ride upwardly onto the tines as the apparatus is dragged in the direction of the arrow. In this manner, the shellfish dug or exposed by scraping of the tines 4 move onto the rake 5 and are collected in a bag net 9 as the apparatus is dragged. In this embodiment, each of the tines 4 of the rake 5 is bent in its rear half end and is straight in its forward half end as shown in FIG. 2. The distance between the tines 4 is determined at a suitable value depending upon the shellfish to be collected so that only shellfish which have grown up to adulthood are caught without collecting the infant shellfish which fall between the tines. Accordingly, the apparatus collects shellfish while preserving the sea's resources.

In the embodiment shown in FIG. 2, the main body or frame 6 comprises two runners or sliding boxes 10 disposed symmetrically at its sides and a bag net support member 8 having bearings 12 formed integral therewith which are connected to the boxes 10 by means of pipes 14. The bearings 12 rotatably support the ends of a rod 16 of the rake 5. In order to keep the tines 4 of the rake 5 at a predetermined angle relative to the boxes 10, a support rod 18 is welded to the tines in the proximity of their mid portions and is fixed at its ends to the boxes 10. A forward rod 20 connects the forward ends of the boxes 10 to form a rigid frame with the boxes and the rod 16.

The length of the sliding boxes 10 is about 1.5 meters; the length of the tines 4 is approximately 1.2 meters; the longer sides of the frame 8 are about 2 meters; and the shorter sides of the frame are about 1 meter. The sliding boxes 10 is made of wood. It may of course be metallic. The tines 4 of the rake 5 are welded at their bottoms to the tubular rod 16 and have wear resistant forward ends 7 for a long durability.

Member 8 may be provided with holes or eyes (not shown) for securing a bag net thereto. The sliding boxes 10 are provided at their leading ends with eyes 22 for dragging of the apparatus.

Figure 3:
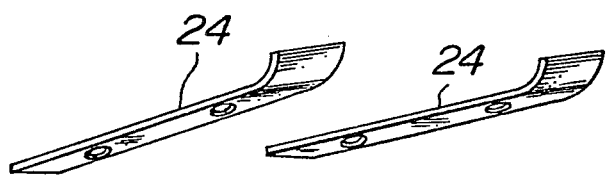
FIG. 3 is a perspective view of a pair of skis for use in the apparatus according to the invention in order to assist the apparatus in its sliding movement across the bed of the body of water.

It is preferable to use a pair of skis 24 secured to the undersides of the sliding boxes to assist the apparatus in its sliding movement as shown in FIG. 3. The skis 24 are preferably secured to the undersides of the sliding boxes by means of bolts having heads sunk in counterbores of each ski.

As can be seen from FIG. 2, the tines 4 of the rake 5 have the substantially straight forward ends. The straight portions of the tines make an angle of 15–40 degrees, normally about 30 degrees to the sliding boxes or the bottom or bed of the sea. Although the angle of the tines is fixed in the embodiment in FIG. 2, it is more advantageous to adjust the angle depending upon the shellfish and conditions of the sea bottom.

Figure 4:
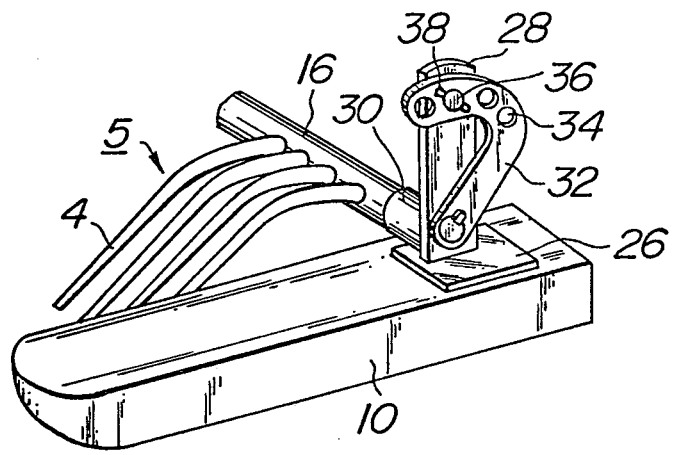
FIG. 4 is a partial perspective view of one embodiment of an angle adjustable rake having angle adjusting means for use in the apparatus according to the invention.

FIG. 4 shows one embodiment of an angle adjustable rake having angle adjusting means therefor. In this embodiment, the sliding box is provided with a metal plate 26, a columnar member or plate 28 and a bearing 30 rigidly fixed to the box as shown in FIG. 4. After one end of a rod or pivot shaft 16 of the rake 5 is inserted in the bearing 30, an adjusting arm 32 is keyed to the end of the rod. Any one of holes 34 formed in an offset section of the adjusting arm 32 is aligned with a hole (not shown) in the upper portion of the columnar member 28 according to the angle of the tines of the rake. Fastening means such as a pin 36 extends through the aligned holes and is retained by means of a split pin (cotter pin) 38, whereby the adjusting arm 32 is rigidly fixed in an adjusted angular position relative to the column plate 28, and the tines are fixed at a predetermined angular relationship with respect to the sea bed. Although the angle adjusting means may be only provided on one of the sliding boxes, respective angle adjusting means may be provided on both sliding boxes which contribute advantageously to the strength of the rake.

The bag net may be any form of a bag adapted to be secured to member 8 for collecting shellfish. It is preferable that the bag be made of a beam trawl net.

A buoy 50 may be connected to the frame by means of a rope in order to indicate the position of the apparatus in the sea (FIG. 1).

Figure 5:
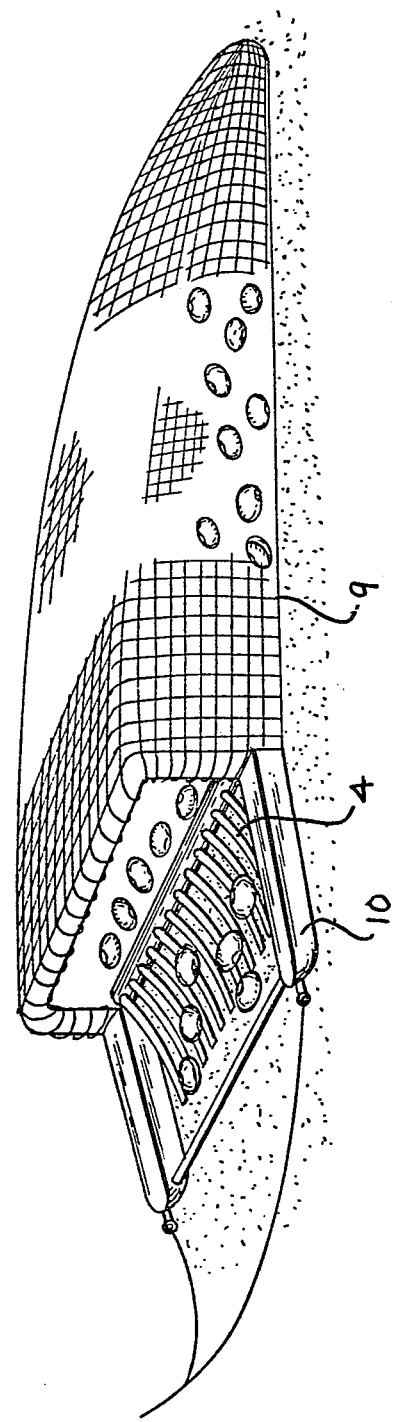
FIG. 5 is a perspective view of another embodiment of the apparatus according to the invention, similar to FIG. 1, wherein the tines of the rake are curved away from the bottom of the sea to scoop shellfish on the sand.

Although the tines 4 in the above embodiments are curved downwardly so as to dig the sand at the bottom of the sea, the tines may be curved in the reverse direction or away from the bottom of the sea so as to scoop the surface of the sand as shown in FIG. 5. The modified tines are preferable to collect shellfish present on the sand other than those in the sand.

Figure 6:
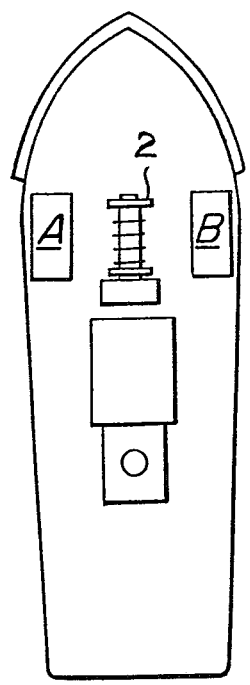
FIG. 6 is a schematic plan view of a boat equipped with two apparatuses according to the invention and a winch to wind up ropes connected to the respective apparatuses.

It is possible to arrange the apparatuses one on each side of the deck of a boat and a winch 40 therebetween for dragging the apparatuses as shown in FIG. 6. A single winch 40 is commonly used for the two apparatuses. Independent winches may, however, be arranged for the respective apparatuses. The engine for driving the boat is advantageously also used for driving the winch. A separate motor may, of course, be used for driving the winch.

Figure 7A:
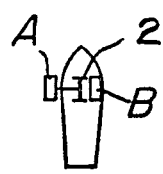
FIGS. 7(a)–(d) are schematic representations showing arrangements of the apparatuses and a ship for implementing a method of collecting shellfish according to the invention.
Figure 7B:
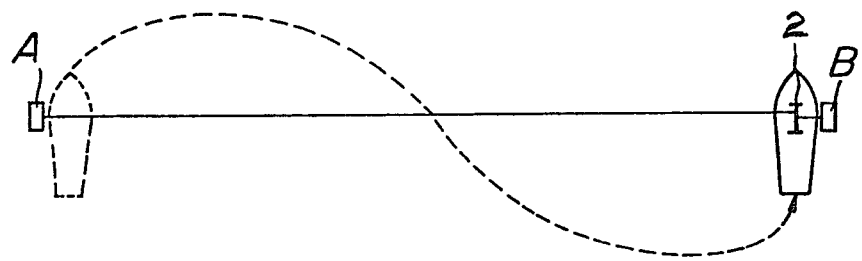
Figure 7C:
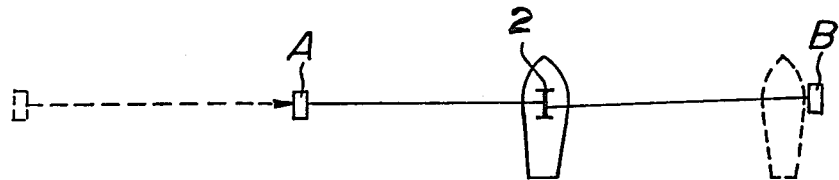
Figure 7D:
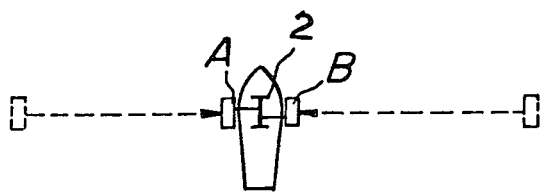

A method of collecting shellfish will be explained with reference to FIGS. 6 and 7 wherein two apparatuses A and B are provided on a boat. Referring to FIG. 7(a), the apparatus A is settled in a first position on the bottom of the sea. Then the boat is moved therefrom to a new position as shown by solid line in FIG. 7(b) about for example 100 meters remote from the original position as shown by broken line in FIG. 7(b), and there the apparatus B is settled on the bottom of the sea. During such movement of the boat, a rope or wire of the apparatus A connected to the boat is of course kept freely extensible. The rope of the apparatus A is then wound up by means of the winch while the rope of the apparatus B is freely extensible. This is the beginning of the collecting operation of the apparatus A. The apparatus A is dragged towards apparatus B by the operation of the winch on the boat, while the boat is also dragged by the resistance of apparatus A, in the direction of apparatus A to the location shown in FIG. 7(c). When the apparatus A has been moved through one third of the distance between the original settled positions of the apparatuses A and B, the boat has also been moved through the same distance as shown in FIG. 7(c). In this position, the apparatuses A and B are at the same distance from the boat. From this position, the ropes of the apparatuses A and B are simultaneously wound up. As the forces acting upon the ropes of the apparatuses are substantially equal, the boat is not moved but the respective apparatuses A and B are pulled toward the boat while shellfish are collected into the respective bags until the apparatuses A and B reach the boat as shown in FIG. 7(d). The apparatuses with bag nets full of the shellfish are then raised and brought onto the deck of the boat.

Another embodiment of the invention will be explained referring to FIG. 8.

After the captain has determined a suitable location with reference to a point such as a summit of a tower or mountain near a coast, an apparatus A from a boat is settled in a first position on the bottom of a body of water as shown at A in FIG. 8(a). Then the boat is moved away from this point in a direction preferably down wind toward a location $P_1$, while a tug rope 50 for apparatus A is being wound off or freely extended. The rope 50 is removed from the boat at a location $P_1$ for example 50 meters remote from the apparatus A. Buoys 52 and 54 are preferably attached to a bridle 51 for convenience for securing the bridle to the boat in a succeeding step.

Then the boat moves further away in the same down wind direction about 120 meters and an apparatus B is settled at the bottom of the body of water. The boat is then returned to the position $P_1$ indicated by the buoys 52 and 54 against the wind while a rope 56 for the apparatus B is being wound off or freely extended. At the point $P_1$, the bridle 51 for the apparatus A is again secured to the boat (FIG. 8(a)).

The rope 56 for the apparatus B is then successively wound up by a winch on the boat, the boat not being moved and without using the boat screw. The driving force by an engine of the boat may be used for driving the winch. In this manner the rope 56 of the apparatus B is wound up about 70 meters. As the result, the apparatuses A and B are moved 35 meters and the boat is moved also 35 meters by the resistance of the apparatus B (FIG. 8(b)). At this time, the apparatuses A and B will be respectively 50 meters equidistant from the boat as shown in FIG. 8(b).

Then the rope 50 for the apparatus A is taken off from the boat at the location $P_2$ and the boat is returned to the position of the apparatus B where the apparatus B is raised onto the boat to receive the shellfish in the net bag of the apparatus B.

The boat is then moved from the position of the apparatus B 70 meters in the same direction down the wind and the apparatus B is settled on the bottom of the water. The boat is then returned to the position $P_2$ of the buoys 52 and 54 of the apparatus A in the direction against the wind while the rope of the apparatus B is being wound off or freely extensible. In the position $P_2$, the bridle 51 is secured to the boat (FIG. 8(c)).

Then the rope 56 of the apparatus B is successively wound up by the winch on the boat. As above described, the rope 56 of the apparatus B is wound up about 75 meters. As the result, the apparatuses A and B are moved 35 meters, respectively and the boat is pulled 35 meters as shown in FIG. 8(d). At this time, the apparatuses A and B are at the same distance 50 meters from the boat.

In this manner, the shellfish on the bottom of the body of water are collected by shifting the positions of the apparatuses little by little (FIG. 8(e)).

When the amounts of shellfish collected by one of the apparatuses are considerably less than those of the other apparatus, it may be preferable to raise the one apparatus only once while the other apparatus is raised twice.

In this case, the rope of the one apparatus is preferably elongated 5-6 meters to drag it somewhat the same bottom of the water for increasing the shellfish to be collected.

When the field of vision is bad such as in a condition of dense fog, buoys are advantageously used on the sea as a reference instead of the summit of a mountain. In order to facilitate the operation, the direction of movement of the boat is preferably selected such that the time in which the bow is against the wind is the longest.

In general, one operation or cycle of work requires about forty minutes and operations fifteen to twenty times a day can be effected.

FIG. 9 illustrates a boat for carrying out the method as shown in FIG. 8, showing the disposition of the apparatuses A and B, buoy and mountain range position fix.

It is understood by those skilled in the art that various changes and modifications may be made in the invention without departing from the spirit and scope thereof.

What is claimed is:

1. A method of collecting on a boat shellfish or the like from a body of water, comprising the steps of settling on the bottom of said body of water from opposing sides of said boat and at a distance from said boat a collecting device, each of said collecting devices having a plurality of tines and a net bag to the rear of said tines, connecting each of said devices to said boat by a rope, maintaining said boat in said water without powered movement, and simultaneously pulling said rope from said boat to cause said devices to move toward said boat while said devices remain on the bottom of said water and thereafter lifting said devices to said boat.

2. A method of collecting on a boat shellfish or the like from a body of water comprising the steps of settling on the bottom of said body of water from opposing sides of said boat and at a distance from said boat a collecting device, each of said collecting devices having a plurality of tines and a net bag to the rear of said tines, connecting each of said devices to said boat by a rope of predetermined length maintaining said boat in said water without powered movement and selectively pulling said ropes from said boat to cause one of said devices and said boat to move relatively toward each other and simultaneously causing the other of said devices to drag along the bottom of the water, both said devices remaining on the bottom of said water during movement and thereafter lifting at least one of said devices to said boat.

3. The method of collecting shellfish or the like according to claim 1 or 2 wherein a winch on the boat is used as means for pulling said devices.

4. A method of collecting on a boat shellfish or the like from a body of water comprising the steps of settling on the bottom of said body of water a first collecting device at a first position at a distance from said boat and a second collecting device at a second position remote from said first position and at a distance from said boat less than that of said first collecting device, each of said devices having a plurality of tines and a net bag to the rear of said tines, connecting each of said devices to said boat by a rope, maintaining said boat in said water without powered movement and dragging said first device by winding the rope thereof on a winch on the boat to gather together the first device and the boat while the shellfish are collected by means of said first device until distances between said boat and the first and second devices are substantially equal, and thereafter simultaneously winding the ropes of said first and second devices to gather together said first and second devices toward the boat while shellfish are collected by means of said first and second devices.

5. The method of collecting shellfish or the like according to claim 1, 2, or 4, comprising the step of raising the device containing the lesser amount of shellfish once for receiving the collected shellfish while the other device is raised twice.

6. A method of collecting on a boat shellfish or the like, comprising steps of sequentially settling on the water bed from a body of water a first collecting device comprising a number of tines and a net bag to the rear of the tines and having a rope for pulling said device, attaching to the end of the rope at least one buoy, settling on the water bed from the boat a second device comprising the same constitution as that of the first device remote from the position of the first device and connecting the end of the associate rope to said boat, returning said boat to the location of said buoy while the rope of the second device is freely extending therefrom, securing said end of the rope of the first device to the boat, pulling the rope of the second device to cause said boat and said second device to move toward each other, while the movement of the boat causes said first device to move for collecting shellfish in said first and second devices, removing said rope of said first device from said boat and, returning said boat to the position of said second device for receiving shellfish therein, settling said second device on the water bed remote therefrom, returning said boat to the position of the end of said rope of said first device while the rope of said second device is freely extending, securing said end of the rope of the first device to the boat, and pulling the rope of the second device to cause said boat and said second device to move toward each other, the movement of the boat toward said second device causing said first device to move for collecting shellfish in said first simultaneously with the collection in said second device, and thereafter repeating these steps.

7. The method according to claim 6 comprising the step of raising the device containing the lesser amount of shellfish once for receiving the collected shellfish while the other device is raised twice.

8. The method according to claim 7, wherein a winch on the boat is used as means for pulling said device.

* * * * *